United States Patent
Lunden et al.

(10) Patent No.: US 10,932,177 B2
(45) Date of Patent: Feb. 23, 2021

(54) AUTONOMOUS USER EQUIPMENT HANDOVER IN LICENSED OR UNLICENSED SPECTRUM

(71) Applicant: NOKIA TECHNOLOGIES OY, Espoo (FI)

(72) Inventors: Jari Petteri Lunden, Espoo (FI); Elena Virtej, Espoo (FI); Claudio Rosa, Randers (DK); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/468,253

(22) PCT Filed: Dec. 4, 2017

(86) PCT No.: PCT/EP2017/081350
§ 371 (c)(1),
(2) Date: Jun. 10, 2019

(87) PCT Pub. No.: WO2018/104217
PCT Pub. Date: Jun. 14, 2018

(65) Prior Publication Data
US 2020/0077319 A1 Mar. 5, 2020

Related U.S. Application Data

(60) Provisional application No. 62/432,316, filed on Dec. 9, 2016.

(51) Int. Cl.
*H04W 76/28* (2018.01)
*H04W 8/02* (2009.01)
(Continued)

(52) U.S. Cl.
CPC .......... *H04W 36/36* (2013.01); *H04W 36/08* (2013.01); *H04W 36/30* (2013.01)

(58) Field of Classification Search
CPC . H04W 36/0083; H04W 28/16; H04W 24/02; H04W 4/70; H04W 36/0079;
(Continued)

(56) References Cited

U.S. PATENT DOCUMENTS 9,730,134 B2 * 8/2017 Yilmaz ................ H04W 8/005
9,860,807 B2 * 1/2018 Axmon .................. H04W 8/02
(Continued)

OTHER PUBLICATIONS

International Search Report and Written Opinion dated Feb. 16, 2018, corresponding to International Patent Application No. PCT/EP2017/081350.
(Continued)

*Primary Examiner* — William D Cumming
(74) *Attorney, Agent, or Firm* — Squire Patton Boggs (US) LLP

(57) ABSTRACT

Various communication systems may benefit from improved handover techniques. For example, a communication system may allow for an autonomous user equipment handover operation in a licensed or unlicensed spectrum. A method may include receiving a measurement condition at a user equipment. The measurement condition may include a maximum duration of time for sending a message to a base station of a source cell. The message may inform the base station of the source cell that an autonomous handover is initiated. The method may also include initiating the sending of the message to the base station of the source cell during the duration of time Tamer to indicate of the measurement condition. In addition, the method may include commencing the autonomous handover after the duration of time of the measurement condition has expired or upon successful
(Continued)

transmission of the message to the base station of the source cell.

23 Claims, 5 Drawing Sheets

(51) Int. Cl.
*H04W 36/36* (2009.01)
*H04W 4/02* (2018.01)
*H04W 36/08* (2009.01)
*H04W 36/30* (2009.01)

(58) Field of Classification Search
CPC ..... H04W 36/04; H04W 36/30; H04W 36/32; H04W 36/00; H04W 36/08; H04W 36/0072; H04W 76/02; H04W 8/02; H04W 74/0833; H04W 64/003; H04W 4/02; H04W 56/0045; H04W 76/28; H04W 8/005; H04W 76/27; H04W 36/36; H04W 60/02
USPC ..... 455/436, 435.1, 450; 370/311, 322, 331, 370/332
See application file for complete search history.

(56) References Cited

U.S. PATENT DOCUMENTS

| | | | | |
|---|---|---|---|---|
| 10,104,565 | B2* | 10/2018 | Yerramalli | H04W 74/0808 |
| 10,237,681 | B2* | 3/2019 | Kim | H04W 60/02 |
| 2007/0149206 | A1* | 6/2007 | Wang | H04W 56/0045 |
| | | | | 455/450 |
| 2010/0254351 | A1* | 10/2010 | Wang | H04J 11/0069 |
| | | | | 370/332 |
| 2013/0003695 | A1* | 1/2013 | Nylander | H04W 36/0083 |
| | | | | 370/331 |
| 2013/0130684 | A1* | 5/2013 | Gomes | H04W 4/70 |
| | | | | 455/435.1 |
| 2015/0079991 | A1* | 3/2015 | Koskinen | H04W 36/0083 |
| | | | | 455/436 |
| 2015/0109979 | A1* | 4/2015 | Miklos | H04W 76/28 |
| | | | | 370/311 |
| 2015/0133121 | A1 | 5/2015 | Li et al. | |
| 2015/0281040 | A1* | 10/2015 | Yamine | H04W 24/02 |
| | | | | 455/436 |
| 2015/0282033 | A1* | 10/2015 | Lunden | H04W 36/0079 |
| | | | | 455/436 |
| 2016/0021594 | A1* | 1/2016 | Yilmaz | H04W 8/005 |
| | | | | 370/332 |
| 2016/0345222 | A1* | 11/2016 | Axmon | H04W 36/04 |
| 2017/0086107 | A1* | 3/2017 | Hu | H04W 28/16 |
| 2018/0227699 | A1* | 8/2018 | Kim | H04W 8/02 |
| 2018/0302826 | A1* | 10/2018 | Frederiksen | H04W 76/27 |
| 2019/0059029 | A1* | 2/2019 | Lunden | H04W 36/36 |
| 2019/0215644 | A1* | 7/2019 | Kim | H04W 4/02 |
| 2019/0289505 | A1* | 9/2019 | Thomas | H04W 36/08 |
| 2019/0380067 | A1* | 12/2019 | Rosa | H04W 36/0072 |
| 2020/0077319 | A1* | 3/2020 | Lunden | H04W 36/30 |

OTHER PUBLICATIONS

ZTE Corporation, "Performance Analysis on Early HO Preparation and Early HO CMD", 3GPP TSG-RAN WG2 Meeting #83, Barcelona, Spain, Aug. 19-23, 2013, R2-132375, 8 pages.

ETRI, "Early HO CMD with Ping-Pong Avoidance, further information", 3GPP TSG-RAN WG2 #84, San Francisco, USA, Nov. 11-15, 2013, R2-134432, 11 pages.

* cited by examiner ly acknowledgement from the base station of the source cell. An example of such a process is shown in FIG. 1A below.

AUTONOMOUS USER EQUIPMENT HANDOVER IN LICENSED OR UNLICENSED SPECTRUM

BACKGROUND

Field

Various communication systems may benefit from improved handover techniques. For example, a communication system may allow for an autonomous user equipment handover operation in a licensed or unlicensed spectrum.

Description of the Related Art

MulteFire (MF) or third generation partnership project (3GPP) technologies allow for the utilization of an unlicensed spectrum band for various radio communications. An unlicensed spectrum, for example, may allow for network entities to transmit on a 5 gigahertz spectrum. Communication in the unlicensed spectrum, however, is subject to channel clearance procedures, such as listen-before-talk (LBT), to ensure that a channel is free before transmission on the channel occurs.

In comparison, communication devices operating in a licensed spectrum are guaranteed access, regardless of the level of interference in the license spectrum. Because strict co-existence regulations exist in the unlicensed spectrum, however, the transmission of all control messages cannot be guaranteed. For example, if an LBT procedure does not succeed, no messages or data may be sent in either the uplink channel or the downlink channel.

The channel clearance procedures used in the unlicensed spectrum may limit the mobility robustness of the communication system by preventing certain transmissions, such as those transmissions related to a handover, from occurring. The channel clearance procedures may block transmissions used to handover a user equipment from a source cell to a target cell. Even if transmissions related to a user equipment handover are not fully blocked, the triggering of the handover event, the measurement report transmission, or the handover command itself may be detrimentally delayed due to channel clearance procedures. These delays may prevent the handover from ever occurring when, for example, the radio link quality has deteriorated so much that the user equipment is no longer able to receive it correctly.

BRIEF DESCRIPTION OF THE DRAWINGS

For proper understanding of the invention, reference should be made to the accompanying drawings, wherein.

DETAILED DESCRIPTION

Figure 1A:
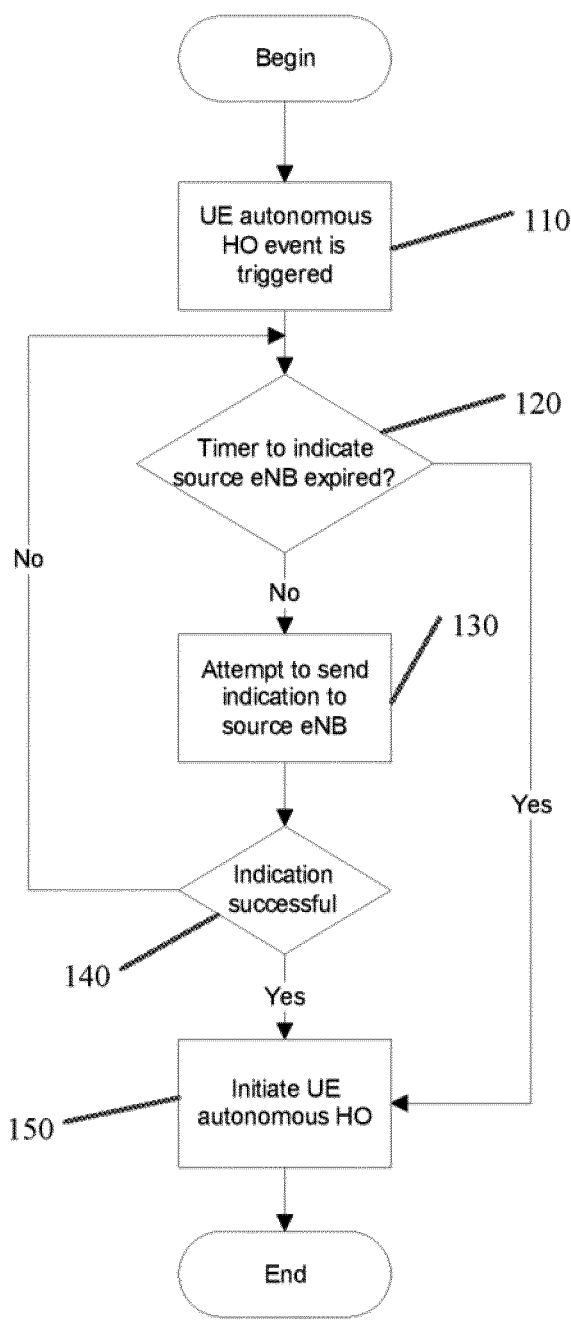
FIG. 1A illustrates a flow diagram according to certain embodiments.

Certain embodiments support autonomous user equipment handover in a licensed or an unlicensed spectrum. These embodiments may help to improve handover reliability, while also reducing the amount of radio resources needed for a handover. In embodiments involving a licensed spectrum, the signaling from the user equipment towards the base station of the source cell may fail, for example, due to low signal quality even if there is no LBT blocking. Handover may commence at the user equipment upon the expiration of a measurement condition. The measurement condition may determine the duration of the timer between the triggering of the handover event and the actual commencement of the handover. The actual commencement of the handover may be the initiation of radio access procedures towards the target cell.

With network-controlled handover procedures, the source cell may inform the base station of the target cell, such as an evolved NodeB (eNB), to prepare for a handover. Network-controlled handover may therefore guarantee a short connection interruption time, meaning that the connection of the user equipment to the network may only be interrupted for a short time during handover. The source cell in a network-controlled handover initiates the handover procedure, and is therefore aware that the user equipment is attempting to gain access to a target cell. In certain embodiments, autonomous user equipment handover procedure may provide for improved handover reliability. In a user equipment autonomous handover, the user equipment may initiate a random access (RA) procedure by itself, without the use of the base station of the source cell. In autonomous user equipment handover, shorter interruption time can be achieved by preparing the target cells with the relevant user equipment context information in advance. For example, the base station of the source cell sends a Handover Request message to the base station of the target cell.

In embodiments involving autonomous user equipment handover, the user equipment may initiate a RA procedure without having to first successfully complete handover signaling with the base station in the source cell. The autonomous user equipment handover may also be initiated without random access procedures, in some embodiments, such as when radio access channel (RACH)-less handover is supported. In such an embodiment, the UE may start communicating with the base station of the target cell using the pre-configured resources or by receiving a grant for uplink transmission from the target cell. The user equipment may also start monitoring the target cell physical downlink control channel for any uplink grant addressed to the UE. The base station in the source cell may therefore not be aware that the user equipment is breaking the communication with the base station by attempting to access the target cell. The lack of knowledge of the base station in the source cell may lead to wasted network resources. For example, the base station in the source cell may continue to schedule operations for the user equipment, not knowing that the user equipment has already initiated handover to a new target cell.

It may be helpful for the user equipment, in some embodiments, to inform the base station of the source cell of its intentions to seize communications with the source cell before commencing the autonomous handover to the target cell. Informing the source cell of the handover in an unlicensed spectrum, however, may be subject to channel clearance procedures. A significant amount of time and resources may therefore be spent trying to access the channel for transmitting a message to the base station in the source cell.

Certain embodiments may help to provide for autonomous user equipment handover in an unlicensed spectrum that reduces wasted radio resources. The radio resources may be saved in the source cell and/or the user equipment initiating the handover. Certain embodiments may also achieve a reliable handover in the unlicensed spectrum, despite being subject to channel clearance procedures, such as LBT. Although certain embodiments refer to transmission of messages in an unlicensed spectrum, some embodiments may also be used to transmit messages in a licensed spectrum.

FIG. 1A illustrates a flow diagram according to certain embodiments. In particular, FIG. 1A illustrates a method for initiating an autonomous user equipment (UE) handover (HO). In step 110, a UE handover HO event may be triggered. The network, or any network entity contained therein, may configure the UE with the autonomous HO event. For example, an autonomous HO event may be that the quality or strength of the radio link between the UE and the source cell has decreased below a certain threshold value. The triggering event may also be, for example, that the UE has moved a predetermined distance from the original location of the UE when the connection to the source cell was first established. Triggering may also be based on measurement reporting events for which the network can configure parameters controlling the triggering conditions such as the offset, time-to-trigger, and hysteresis of the event. One example of a triggering event may be event A3, in which a neighbor cell becomes stronger than a serving cell. Any other event may be used as well to trigger the UE autonomous HO. As part of the configuration, the network may include an indication of whether the UE should inform the base station in the source cell of the HO before commencing the autonomous HO. The configuration may also include a measurement condition.

A measurement condition, in certain embodiments, may indicate to the UE a maximum duration of time between which the UE autonomous HO is triggered, and the commencement of the autonomous HO, in which the UE, for example, initiates RA procedures. The duration of time can also indicate to the UE a maximum duration in which the UE may attempt to send a message or a signal informing the source cell that an autonomous handover is to be initiated before the actual HO occurs. In other words, the message may be configured to inform the base station of the source cell that the UE will be initiating the autonomous HO. The message sent from the UE to the source cell may include just a measurement report or a measurement report with an additional indication of the target cell for the autonomous HO.

Upon expiration of the maximum duration of time of the measurement condition, or upon successful transmission of the message informing the source cell that an autonomous handover is to be initiated, the UE may commence the autonomous procedure, for example by initiating the RA procedure towards the target cell. In other words, the UE may delay the commencing of the autonomous HO until the expiration of the measurement condition. In some embodiments, the measurement condition may be determined by the base station of the source cell or by any other network entity.

The measurement condition, for example, may include a specific numerical timer value for the maximum duration of time. The timer value may be in milliseconds (ms), or in a predetermined number of frames or subframes. For example, the UE may attempt to send a message to the base station in the source cell for 10 ms or for 10 subframes. Any other timer value may be possible as well. After attempting to send the message for 10 ms or 10 subframes, the UE may then initiate the autonomous HO, regardless of whether or not the base station of the source cell received the message. In other embodiments, the duration of the measurement condition may be a number of access attempts, for example, a number of non-successful scheduling request attempts towards the base station of the source cell. After a certain number of access attempts, the UE may initiate the autonomous HO, even if the base station in the source cell has yet to successfully receive the requests. The UE may be said to "give up" its attempt to inform the source cell of the HO before proceeding to initiate the autonomous HO.

In some other embodiments, the maximum duration of time of the measurement condition may be represented by a radio link quality threshold. As long as the radio link between the UE and the base station of the source cell remains above the threshold, the UE may initiate the sending of the message, or continue to attempt to message the base station, via the licensed or unlicensed spectrum. If the radio link quality of the source cell drops below the threshold, the duration can be said to have expired. The UE may then commence the autonomous handover to the target cell, even if the message to the source cell was not successful. Certain embodiments may include a plurality of measurement conditions, for example a radio link quality threshold and a timer. The expiration of the duration of a single measurement condition of the plurality of measurement conditions, in certain embodiments, may allow the UE to commence the autonomous handover.

Once the UE autonomous handover has been triggered in step 110, a timer is started to indicate whether the duration of time included in the measurement condition has expired, as shown in step 120. Once the duration of time has expired, the UE may initiate autonomous HO regardless of whether the message was actually received by the source cell. In some embodiments, the UE may initiate the autonomous HO without even attempting to send a message to the source base station. For example, in case of a channel clearance procedure, such as LBT, blocking the message from being sent to the source cell, and/or in case of a low signal quality, the UE may not be able to successfully transmit the message. Delaying the message to the base station may increase the duration of the interruption caused by the HO.

In some embodiments, therefore, the duration of time of the measurement condition can be said to expire instantaneously, allowing the UE to initiate autonomous HO without even attempting to inform the source base station of the handover. In certain embodiments, a specific value, for example a value of zero, may be used in a field within a message when signaling the measurement condition or the timer configuration to the UE. Upon receiving the specific value, the UE may forgo sending the message to the source cell, and may immediately or shortly thereafter initiate autonomous HO. In other embodiments, even if the timer has not yet expired, if the UE successfully transmits the indication to the source cell, it is allowed to initiate the autonomous HO procedure.

If the timer has not expired, the UE may attempt to send the message to the base station of the source cell, also known as the source eNB, in step 130. The UE may attempt to send the message one or more times while the duration of the measurement condition has yet to expire. If the UE receives an indication that the message was successfully sent to the source cell, as shown in step 140, the UE may initiate the autonomous HO, even if the maximum duration of time has not yet expired. If the UE does not receive such an indication, however, the UE may again go through steps 120 and 130 of FIG. 1A until the timer expires.

The indication of a successfully transfer in step 140 may, in certain embodiments, be a successful transmission using channel clearance procedures, such as LBT. For example, once a transmission is accepted by the channel clearance procedures, the message can be said to have been successfully transferred in step 140. The UE may then initiate the autonomous HO to the target cell, as shown in step 150. In other embodiments, the indication may be an acknowledgement received from the base station of the source cell. In some embodiments, instead of receiving an explicit acknowledgment message from the source cell, the UE may imply that the message was received by the source cell when no retransmission was scheduled by the base station in the source cell. When no retransmission has been scheduled for a predetermined time window starting from the uplink transmission of the message, the UE can derive that the message was received by the base station of the source cell. In certain embodiments, the predetermined time window may be hard coded in the specifications, may be configured by base station of the source cell, or may be determined by the UE itself.

In certain embodiments, the message sent from the UE to the base station of the source cell, informing the base station of the impending initiation of the UE autonomous HO, may include more than a measurement report. The message may include any other information that may help to inform the base station of the source cell of the UE autonomous HO. For example, the other information may include an explicit indication of the time of the triggering event of the HO action, such as a specific frame and/or subframe number. The other information may help to facilitate synchronization between the UE and the source eNB. Synchronization may be helpful in an embodiment in which the UE may be expected to wait for the HO command for a configured maximum duration of time before commencing the autonomous HO towards the target cell. The benefits of synchronization may be that the base station in the source cell knows accurately when the UE may commence the autonomous HO, and does not unnecessarily attempt to schedule or transmit to the UE after that time. For example, the base station may not attempt to send the UE a handover command. This avoids wasting resources on transmissions that the UE may no longer be attempting to receive.

Figure 1B:
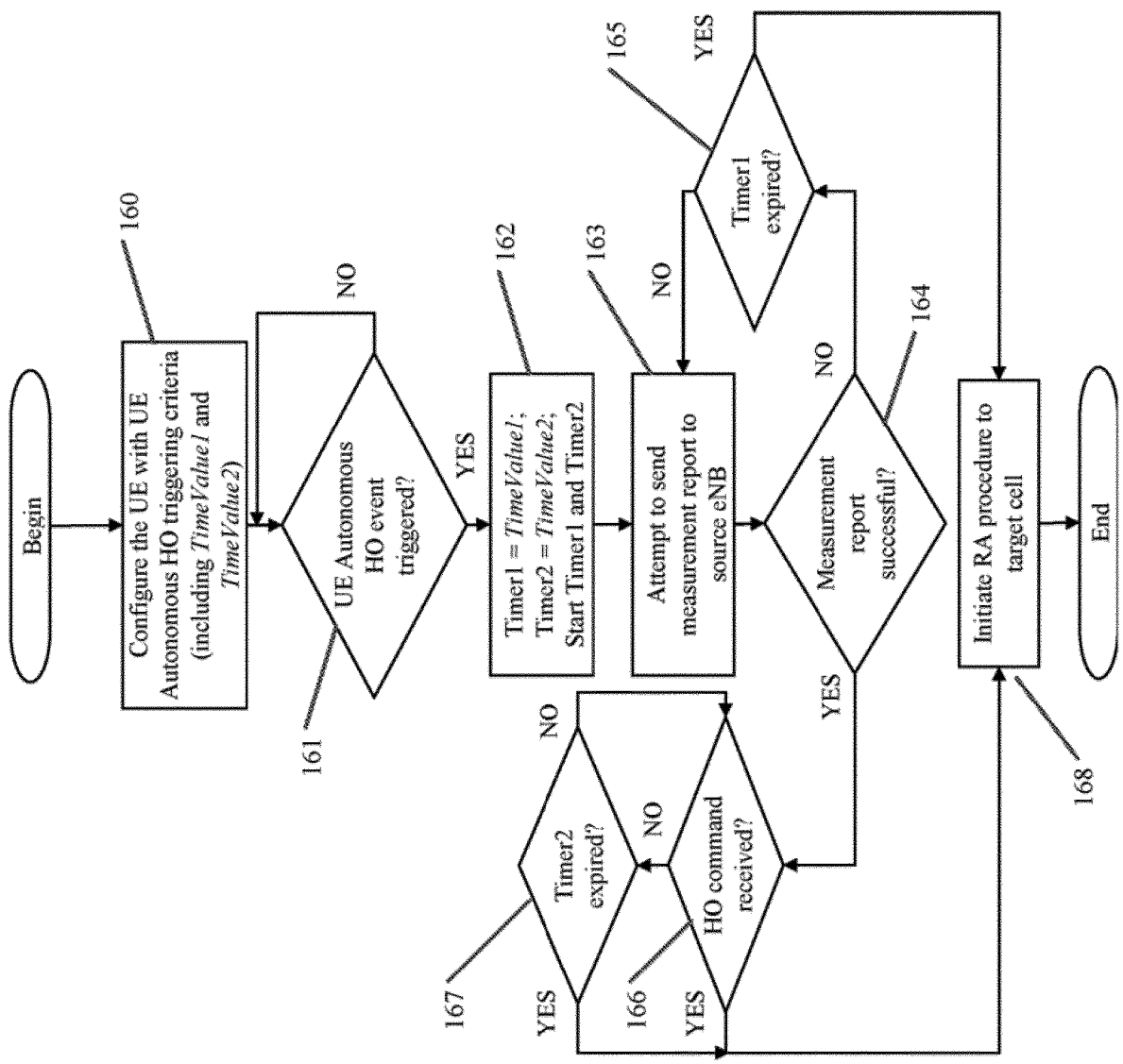
FIG. 1B illustrates a flow diagram according to certain embodiments.

FIG. 1B illustrates a flow diagram according to certain embodiments. In particular, FIG. 1B illustrates an embodiment having two independent time configurations. A first time may include a time value in which the UE should attempt to transmit an indication or a message informing the base station of the autonomous HO to the base station of the source cell before commencing the autonomous HO procedure. The first time, for example, may have a value of 30 ms. The second time, on the other hand, may include a time value in which the UE should wait for the HO command, after already having transmitted the message or the measurement report to the base station of the source cell, before it may commence the autonomous HO procedure. For example, the second time may have a value of 100 ms. If the HO command is received during the second time period, then the UE may undergo a non-autonomous HO.

In step 160 in FIG. 1B, the UE may be configured with the UE autonomous HO triggering criteria, which may include both the first time, represented by TimeValue1, and the second time, represented by TimeValue2. When the UE autonomous HO event has been be triggered, as shown in step 161, two timers may start, as shown in step 162. A first timer, Timer1, may be a timer for TimeValue1, while a second timer, Timer 2, may be a timer for TimeValue2. In step 163, the UE may attempt to send the message or the measurement report to the base station in the source cell.

A determination may then be made in step 164 as to whether or not the measurement report was successfully sent to the base station of the source cell. If the message was not successfully sent, the UE may determine whether or not Timer1 has expired, as shown in step 165. If Timer1 has expired, the UE may initiate RA procedure to the target cell, as shown in step 168, via autonomous HO. If Timer1 has yet to expire, however, then the UE may again attempt to send or initiate the sending of the message to the base station of the source cell, as shown in step 163. Steps 164 and 165 may then be repeated.

In certain embodiments, in step 164 the UE may determine that the measurement report has been successfully sent to the base station of the source cell. In such an embodiment, the UE may then determine whether the HO command was received, as shown in step 166. If the HO command was received, the UE may either immediately or after a short period of time proceed to initiate the RA procedure with the target cell using non-autonomous HO. If the HO command in step 166 has not been received, however, then the UE may determine whether Timer2 has expired, as shown in step 167. When the UE determines that Timer2 has expired, it may immediately or after a short period of time proceed to initiate the RA procedure with the target cell via autonomous HO, as shown in step 168. If Timer2 has yet to expire, the UE may repeat step 166 and check whether or not the HO command has been received.

In some embodiments, the UE may be configured with a plurality of measurement conditions. For example, the UE may be configured with two different time durations or two different transmission attempt limits. Thus, there may be, for example, a different time duration for low radio link quality and for high radio link quality, so that autonomous HO action may occur faster in a low link quality situation.

In other embodiments, the UE may be configured with at least one time duration and at least one different transmission attempt limit. Each of the plurality of measurement conditions may be applied by the UE in different circumstances. For example, one of the measurement conditions may be used when the transmission of the message from the UE to the base station of the source cell is blocked by the channel clearance procedures. Another of the measurement conditions may be used when the transmission of the message from the UE to the base station of the source cell fails due to low signal quality. The low signal quality may be caused by an excessive amount of signal interference, for example.

The measurement condition, in certain embodiments, may depend on whether the UE autonomous HO is an intra-frequency HO or an inter-frequency HO. Although a UE may hand over to a new cell, the UE may use the same transmission frequency previously used with the source cell. When the same transmission frequency is used, this may be known as an intra-frequency HO. In other embodiments, the transmission frequency may change when the UE is handed over to a new cell. When a different transmission frequency is used, this may be known as an inter-frequency HO. In an intra-frequency HO, the message from the UE to the source base station may remain blocked by channel clearance procedures, even when the cell is changed. In such embodiments, it may be helpful for the measurement condition to indicate a shorter duration of time before commencing the autonomous HO.

Figure 2:
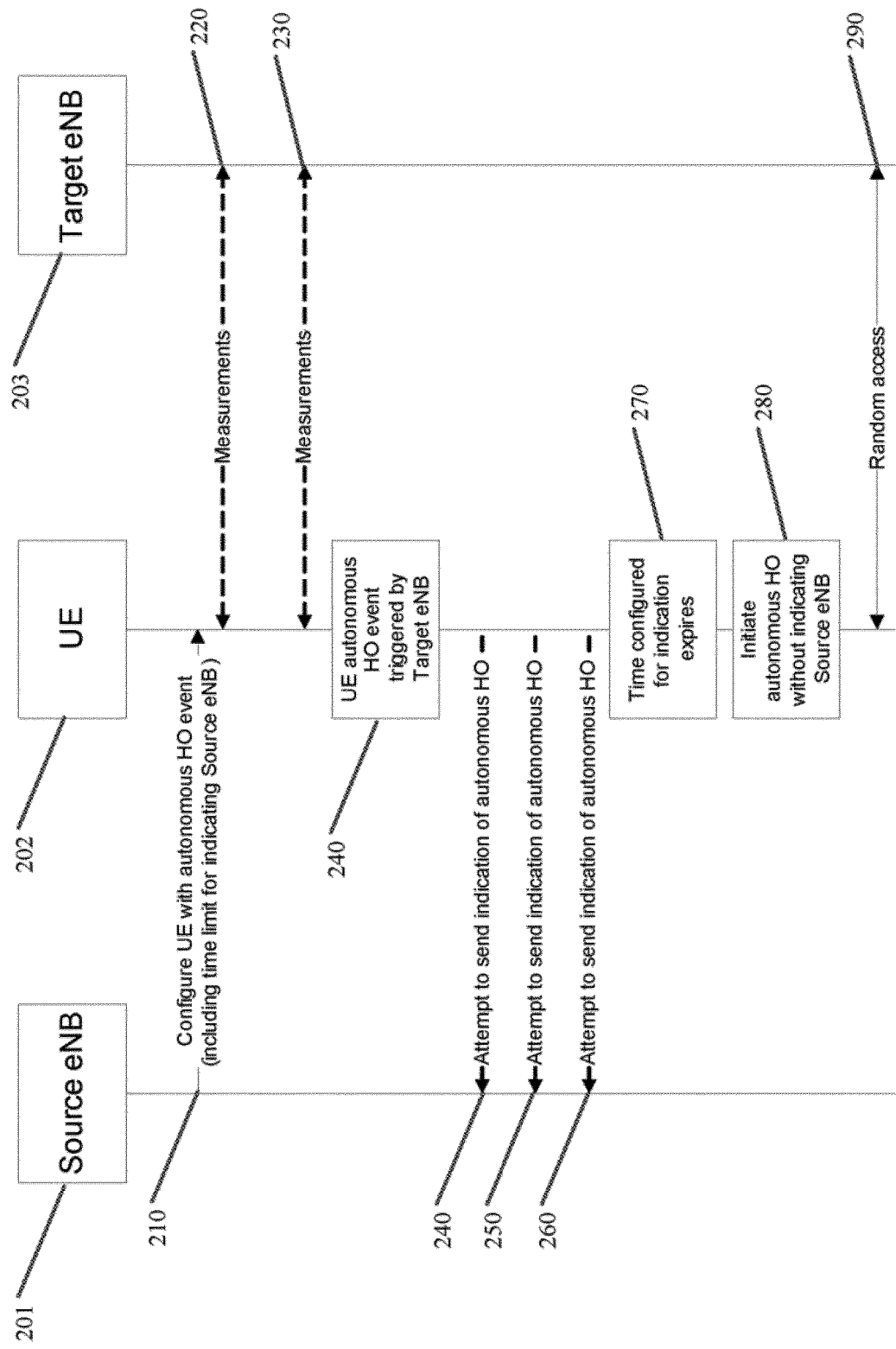
FIG. 2 illustrates a signal flow diagram according to certain embodiments.

FIG. 2 illustrates a signal flow diagram according to certain embodiments. In particular, FIG. 2 illustrates a UE autonomous HO with a measurement condition, as described in FIG. 1A. In step 210, source eNB 201, which is the base station of the source cell, can configure UE 202 with autonomous HO event. The UE 202 may also be configured with a measurement condition. In other embodiments, any other network entity may be used to configure the UE with the autonomous HO event and/or the measurement condition. UE 202 may then take measurements of target eNB 203, which is the base station in the target cell, as shown in steps 220 and 230. Based on measurements 220 and 230 taken from target eNB 203, the UE autonomous HO event may be triggered in step 240, similar to step 110 in FIG. 1A.

Once the autonomous HO event is triggered, UE 202 may initiate the sending of at least one message to source eNB 201 in order to inform source eNB 201 of the impending autonomous HO. In addition, upon the triggering of the event a timer may be started. UE 202 may continue to attempt to send the message to source eNB 201 until UE 202 receives an indication that the message was transmitted to or received by the source eNB 201 and/or until a maximum duration of time of the measurement condition expires. In the embodiment shown in FIG. 2, UE 202 attempts to send the message to source eNB 201 three times, as shown in steps 240, 250, and 260. In step 270, the maximum duration of time of the measurement condition expires, at which point UE 202 may commence the autonomous HO in step 280, regardless of whether source eNB 201 received the message sent from UE 202. In step 290, UE 202 commences the autonomous handover by initiating random access to target eNB 203.

Figure 3:
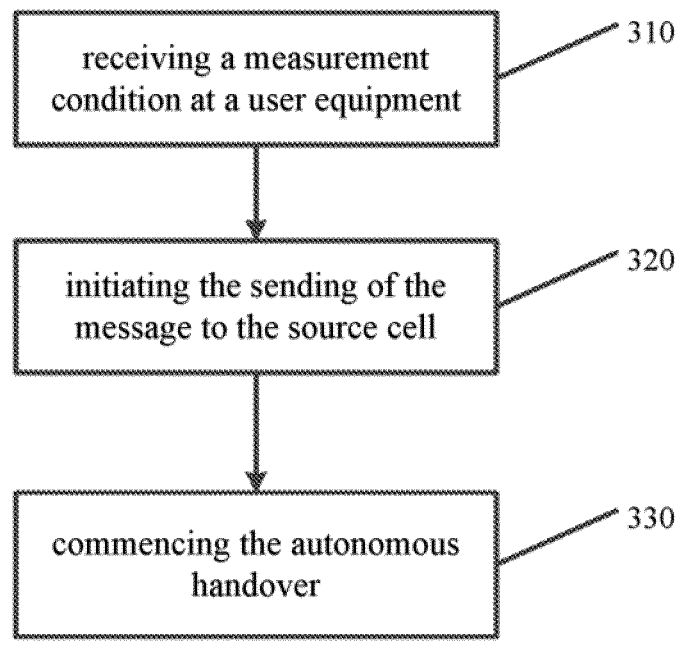
FIG. 3 illustrates a flow diagram according to certain embodiments.

FIG. 3 illustrates a flow diagram according to certain embodiments. In particular, FIG. 3 illustrates a flow diagram from the perspective of the user equipment. In step 310, the UE receives measurement condition at the user equipment. The measurement condition may include a maximum duration of time for sending a message via a licensed or an unlicensed spectrum to a base station of a source cell. The message informs the base station of the source cell that an autonomous handover is initiated. The duration of time may be a maximum time because the duration of time may be reduced upon a successful transmission of the message to the base station of the source cell. The measurement condition, in other embodiments, may be a threshold quality of a radio link between the user equipment and the base station of the source cell.

In step 320, the UE may initiate the sending of the message via the licensed or the unlicensed spectrum to the base station of the source cell during the duration of time of the measurement conditions. The initiation of the sending of the message may be triggered by a certain predetermined autonomous HO event. In certain embodiments, the user equipment may disconnect from the base station at the source cell prior to the initiations of the handover. In step 330, the UE may commence the autonomous HO in the licensed or unlicensed spectrum towards a base station at a target cell after the duration time of the measurement condition has expired or upon successful transmission of the message to the base station of the source cell.

In other embodiments, the UE may inform the base station at the source cell of the handover after commencing the autonomous handover. In such embodiments, the UE may simultaneously communicate with both the base station in the source cell and the base station in the target cell. In some embodiments, the UE may use time division multiplexing (TDM) to alternate between the source cell and the target cell in time. An embodiment in which the UE informs the base station at the source cell of the handover after commencing the autonomous handover may also utilize inter-frequency HO, allowing the UE to independently transmit and/or receive on two different frequencies.

Figure 4:
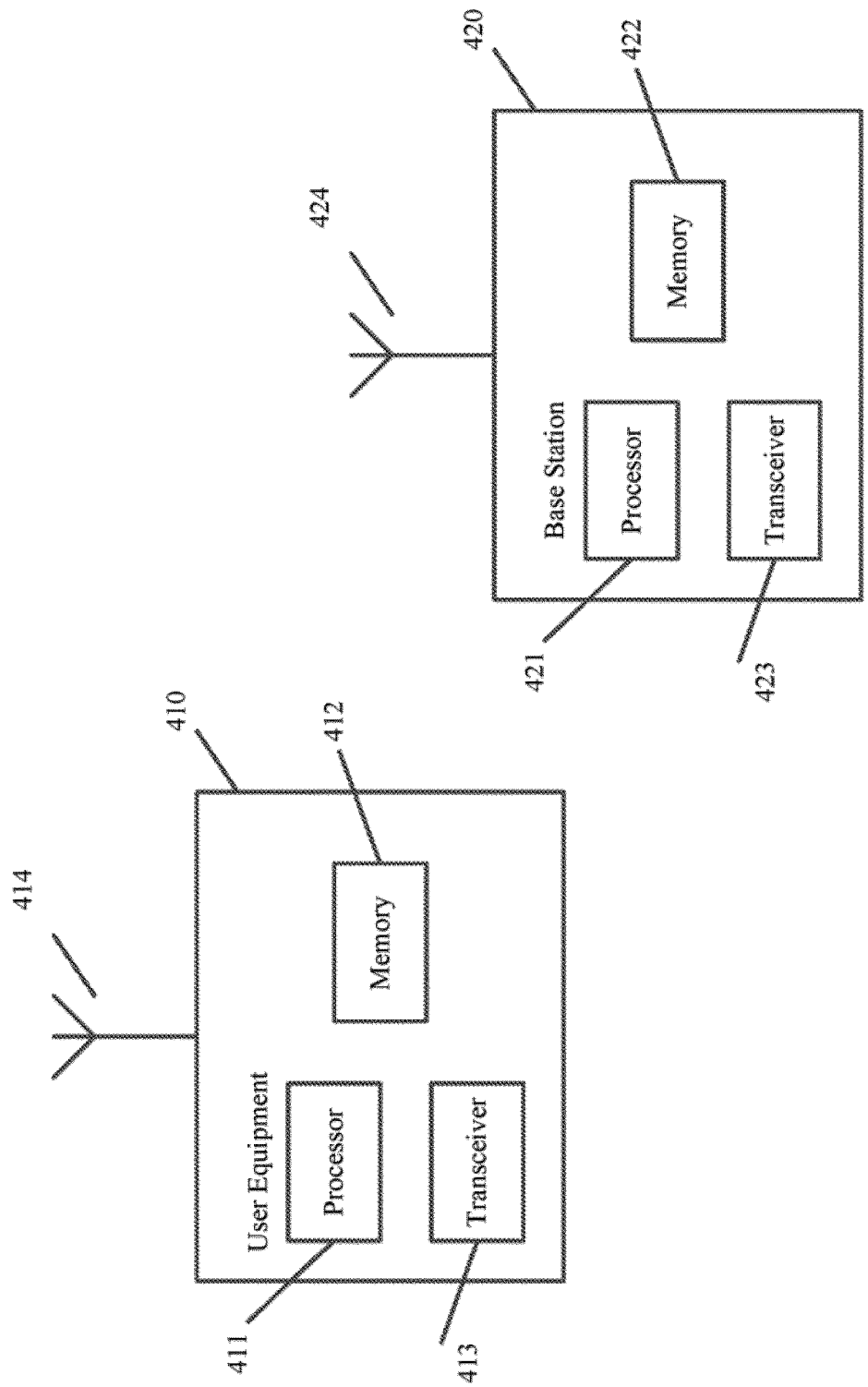
FIG. 4 illustrates a system according to certain embodiments.

FIG. 4 illustrates a system according to certain embodiments. It should be understood that each signal or block in FIGS. 1, 2, and 3 may be implemented by various means or their combinations, such as hardware, software, firmware, one or more processors and/or circuitry. In one embodiment, a system may include several devices, such as, for example, base station 420 or UE 410. The system may include more than one UE 410 and more one base station 420. Base station 420 may be a base station of the source cell or the target cell, such as a 5$^{th}$ generation NodeB (5GNB) or an eNB. In other embodiments, base station 420 may be any other network node, access node, server, or host.

Each of these devices may include at least one processor or control unit or module, respectively indicated as 411 and 421. At least one memory may be provided in each device, and indicated as 412 and 422, respectively. The memory may include computer program instructions or computer code contained therein. One or more transceiver 413 and 423 may be provided, and each device may also include an antenna, respectively illustrated as 414 and 424. Although only one antenna each is shown, many antennas and multiple antenna elements may be provided to each of the devices. Other configurations of these devices, for example, may be provided. For example, base station 420 and UE 410 may be additionally configured for wired communication, in addition to wireless communication, and in such a case antennas 414 and 424 may illustrate any form of communication hardware, without being limited to merely an antenna.

Transceivers 413 and 423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 410 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a user equipment, may include means for carrying out embodiments described above in relation to FIGS. 1, 2, and 3. In certain embodiments, at least one memory including computer program code can be configured to, with the at least one processor, cause the apparatus at least to perform any of the processes described herein.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as base station 420 or UE 410, to perform any of the processes described above (see, for example, FIGS. 1, 2, and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 4 illustrates a system including a base station 420 and UE 410, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 410 may likewise be provided with a variety of configurations for communication other than communicating with base station 420. For example, the UE 410 may be configured for device-to-device, machine-to-machine, or vehicle-to-vehicle communication.

Certain embodiments can provide a method, apparatus, means for, or a computer product for configuring the UE with a measurement condition, and upon the expiration of the duration of time included in the measurement condition the UE may commence autonomous handover. The embodiments described above can help to reduce the amount of wasted radio resources at the source cell, while also achieving a handover reliability in an unlicensed spectrum that employs a channel clearance procedure. The use of the measurement condition, as described in the above embodiments, achieves significant improvements to the functioning of a network and/or to the functioning of the different network entities or user equipment within the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary
3GPP Third Generation Partnership Project
DL Data Layer
eNB evolved Node B
HO Handover
LBT Listen-Before-Talk
LTE Long Term Evolution
MF Multefire
RA Radio Access
UE User Equipment According to a first embodiment, a method may include receiving a measurement condition. The measurement condition may include a maximum duration of time for sending a message to a base station of a source cell. The message may inform the base station of the source cell that an autonomous handover is initiated. The method may also include initiating the sending of the message to the base station of the source cell during the duration of time of the measurement condition. In addition, the method may include commencing the autonomous handover after the duration of time of the measurement condition has expired or upon successful transmission of the message to the base station of the source cell.

In a variant, the message may be sent via a license spectrum or an unlicensed spectrum.

In a variant, the method may also include informing the base station at the source cell of the handover after commencing the autonomous handover. The user equipment or the base station of the target cell may be used for informing the base station of the target cell.

In yet another variant, the method may further include disconnecting from the base station at the source cell prior to the initiation of the handover.

In an additional variant, the measurement condition may include a numerical timer value during which the user equipment will attempt to send the message to the base station of the source cell.

In a variant, the measurement condition may include a number of access attempts to the base station of the source cell.

In another variant, the measurement condition may include a threshold quality of a radio link between the user equipment and the base station of the source cell. The expiration of the measurement condition may include the quality of the radio link decreasing below the threshold.

In yet another variant, the commencing of the autonomous handover in the unlicensed spectrum towards the base station at the target cell may include initiating at the user equipment random access procedures towards the base station of the target cell.

In yet another variant, the random access procedure may be either contention based access or contention free access.

In a further variant, the message to the base station of the source cell may include a measurement report.

In yet another variant, the measurement condition may indicate to the user equipment to commence the autonomous handover to the target cell without sending the message to the base station of the source cell.

In an additional variant, the message to the base station of the source cell may include information of when the measurement condition was triggered in the user equipment.

In another variant, the sending of the message to the base station in the source cell may be successful when a channel clearance procedure is successful.

In an additional variant, the method may include receiving an acknowledgement from the base station of the source cell that the message was successfully received.

In a further variant, the measurement condition may include a plurality of conditions, and the measurement condition is selected among the plurality of conditions based on at least one of a signal quality, a channel clearance procedure success, whether the handover is an intra-frequency handover, or whether the handover is an inter-frequency handover.

According to a second embodiment, an apparatus can include at least one processor and at least one memory and computer program code. The at least one memory and the computer program code can be configured to, with the at least one processor, cause the apparatus at least to perform the method according to the first embodiment, and any of its variants.

According a third embodiment, an apparatus can include means for performing the method according to the first embodiment, and any of its variant.

According to a fourth embodiment, a computer program product may encode instructions for performing a process including the method according to the first embodiment, and any of its variants.

According to a fifth embodiment, a non-transitory computer-readable medium may encode instructions that, when executed in hardware, perform a process including the method according to the first embodiment, and any of its variants.

The invention claimed is:

1. A method, comprising:
   receiving at a user equipment a measurement condition including a maximum duration of time for sending a message informing that an autonomous handover is being initiated;
   initiating the sending of the message from the user equipment to an access node of a source cell during the duration of time of the measurement condition, wherein the message is sent when a channel clearance procedure is successful; and
   commencing the autonomous handover of the user equipment towards an access node of a target cell after the duration of time of the measurement condition has expired.

2. The method according to claim 1, further comprising commencing the autonomous handover to the access node of the target cell upon successful transmission of the message to the access node of the source cell.

3. The method according to claim 1, further comprising informing the access node of the source cell of the handover after commencing the autonomous handover.

4. The method according to claim 1, further comprising disconnecting from the access node of the source cell prior to commencing the autonomous handover.

5. The method according to claim 1, wherein the measurement condition includes a numerical timer value during which the user equipment will attempt to send the message to the access node of the source cell.

6. The method according to claim 1, wherein the measurement condition includes a number of access attempts to the access node of the source cell before commencing the autonomous handover.

7. The method according to claim 1, wherein the measurement condition includes a threshold quality of a radio link between the user equipment and the access node of the source cell, and wherein expiration of the measurement condition includes a quality of the radio link decreasing below the threshold.

8. The method according to claim 1, wherein the commencing of the autonomous handover includes initiating at the user equipment a random access procedure towards the access node of the target cell.

9. The method according to claim 8, wherein the random access procedure is either contention based access or contention free access.

10. The method according to claim 1, wherein the message to the access node of the source cell includes a measurement report.

11. The method according to claim 1, wherein the message to the access node of the source cell includes information of when the measurement condition was triggered in the user equipment.

12. An apparatus, comprising:
   at least one processor; and
   at least one memory and computer program code, the at least one memory and the computer program code configured, with the at least one processor, to cause the apparatus at least to:
   receive at a user equipment a measurement condition including a maximum duration of time for sending a message informing that an autonomous handover is being initiated,
   initiate the sending of the message from the user equipment to an access node of a source cell during the duration of time of the measurement condition, wherein the message is sent when a channel clearance procedure is successful; and
   commence the autonomous handover of the user equipment towards an access node of a target cell after the duration of time of the measurement condition has expired.

13. The apparatus according to claim 12, wherein the at least one memory and the computer program code are further configured, with the at least one processor, to cause the apparatus to commence the autonomous handover to the access node of the target cell upon successful transmission of the message to the access node of the source cell.

14. The apparatus according to claim 12, wherein the at least one memory and the computer program code are further configured, with the at least one processor, to cause the apparatus to inform the access node of the source cell of the handover after commencing the autonomous handover.

15. The apparatus according to claim 12, wherein the at least one memory and the computer program code are further configured, with the at least one processor, to cause the apparatus to disconnect from the access node of the source cell prior to commencing the autonomous handover.

16. The apparatus according to claim 12, wherein the measurement condition includes a numerical timer value during which the apparatus will attempt to send the message to the access node of the source cell.

17. The apparatus according to claim 12, wherein the measurement condition includes a number of access attempts to the access node of the source cell before commencing the autonomous handover.

18. A non-transitory computer-readable medium encoding instructions that, when executed in hardware, perform a process including the method according to claim 1.

19. The apparatus according to claim 12, wherein the measurement condition includes a threshold quality of a radio link between the user equipment and the access node of the source cell, and wherein expiration of the measurement condition includes a quality of the radio link decreasing below the threshold.

20. The apparatus according to claim 12, wherein the commencing of the autonomous handover includes initiating at the user equipment a random access procedure towards the access node of the target cell.

21. The apparatus according to claim 12, wherein the random access procedure is either contention based access or contention free access.

22. The apparatus according to claim 12, wherein the message to the access node of the source cell includes a measurement report.

23. The apparatus according to claim 12, wherein the message to the access node of the source cell includes information of when the measurement condition was triggered in the user equipment.

* * * * *